Feb. 9, 1932.  H. L. DARDELET  1,844,382
SEPARABLY JOINTED MEMBER
Filed Aug. 23, 1929  2 Sheets-Sheet 2
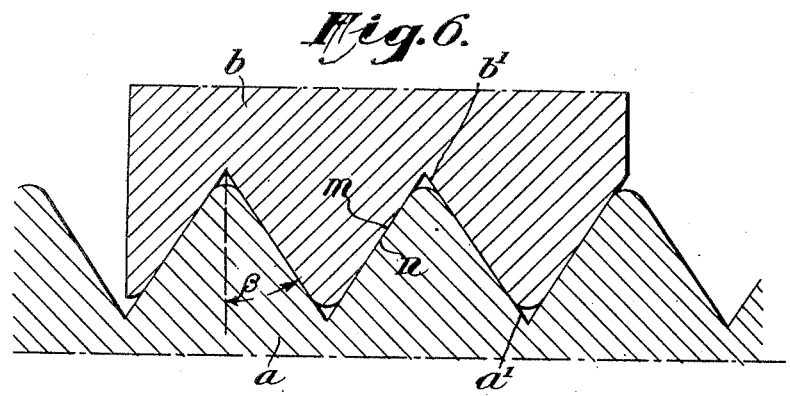
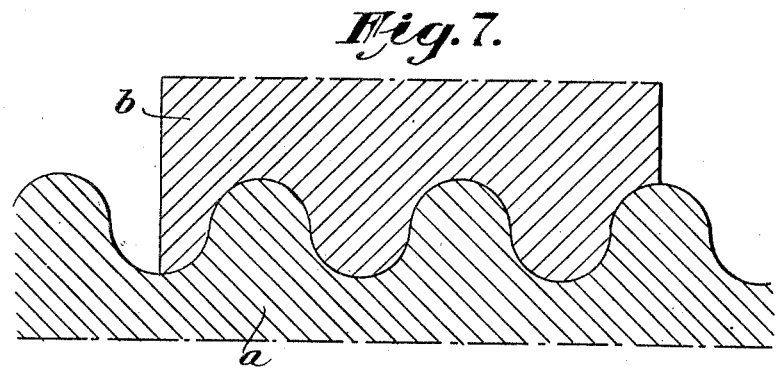
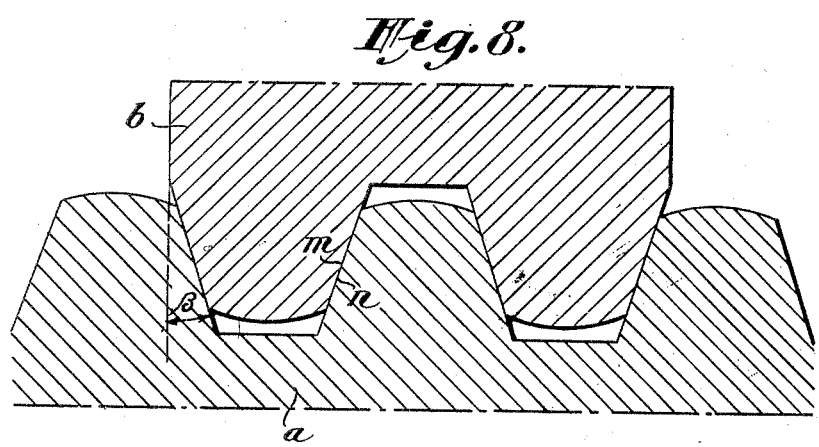
INVENTOR
HUGUES LOUIS DARDELET
BY
his ATTORNEYS Patented Feb. 9, 1932

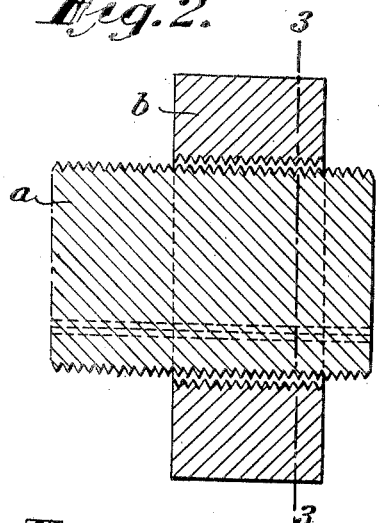
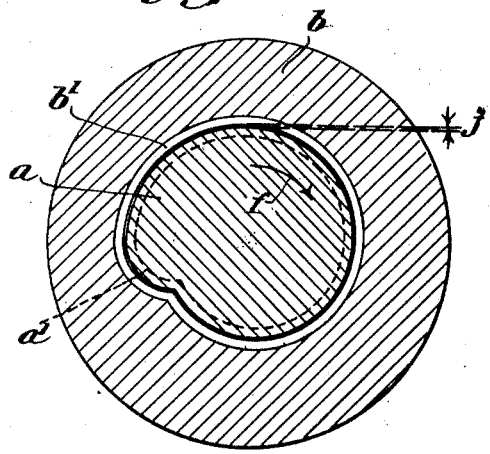
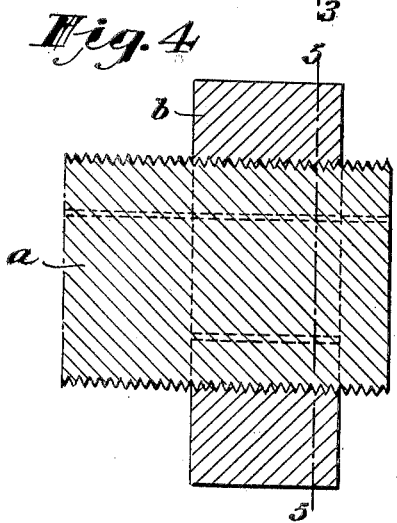
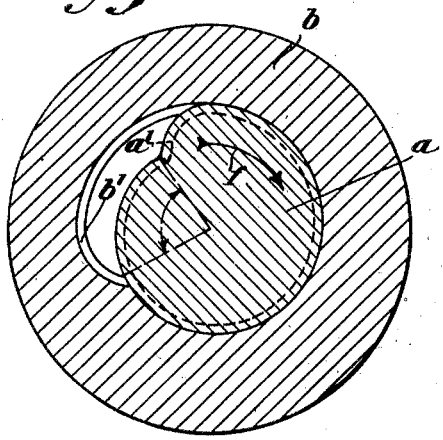
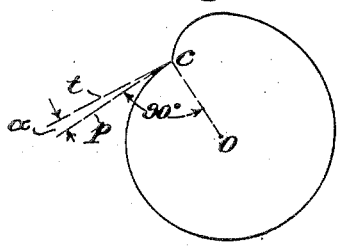

1,844,382

UNITED STATES PATENT OFFICE

HUGUES LOUIS DARDELET, OF NANTES, FRANCE, ASSIGNOR, BY MESNE ASSIGNMENTS, TO DARDELET THREADLOCK CORPORATION, OF NEW YORK, N. Y., A CORPORATION OF DELAWARE

SEPARABLY JOINTED MEMBER

Application filed August 23, 1929, Serial No. 387,931, and in France December 13, 1928.

It is already known how to assemble two pieces, one male and the other female, characterized by the fact that the two pieces are straight cylinders having as directrices for their external and internal profiles, respectively, a portion of an Archimedean spiral the two ends of which are connected by any curve whatsoever, so that through an angular shifting of small amplitude of one piece with respect to the other, while interfitted, the two pieces become tightly joined by friction, and so remain when the effort which has established their contact ceases, if the angle $\alpha$ enclosed between the perpendicular to the shortest vector and the tangent to the spiral at the end of this vector is such that the tangent of angle $\alpha$ is less than $f$, $f$ being the friction co-efficient of the materials in contact.

In Fig. 1 of the drawings is shown this angle $\alpha$ which the tangent $t$ at point $c$ of the spiral makes with the perpendicular $p$ to vector $o$ $c$ drawn from point $c$.

This angle $\alpha$ may be made sufficiently small (by making the pitch of the spiral sufficiently small) for the binding together by friction of the pieces to be a very powerful one, but there are cases (when the pieces are under great stresses in the direction of the axis, or when the pieces are subject to flexing stresses) where this frictional effort which binds the pieces together becomes insufficient to prevent all shifting of one of the pieces with respect to the other.

The system of assembling which is going to be described hereinafter, and which is the subject matter of the invention, makes it possible to substitute, in the direction of the axis, for the friction effort binding the pieces, a positive resistance due to the material, similar to that which a screw thread can give.

This system of assembling male and female pieces having a transverse section in the form of an Archimedean spiral, or portion of such spiral, is characterized by the fact that the respective external and internal surfaces of the two pieces which are to come in contact, instead of being smooth, are provided with circumferential grooves of any outline whatsoever in cross section, which grooves in the two pieces are arranged in a manner for the ribs of one member to engage in the grooves of the other member by a simple, angular, relative displacement of one of the two pieces with respect to the other. Under such circumstances, the sides of the grooves constitute, in the tightened position, shoulders or axial thrust-resisting abutment surfaces which positively prevent any axial displacement between the engaged pieces.

The following description, with regard to the attached drawings, given by way of example, will show how the invention can be carried into effect.

Fig. 1 shows the low pitch Archimedean spiral profile;

Fig. 2 shows a longitudinal section of two pieces, the male piece $a$ and the female piece $b$ having, respectively, in transverse section, external and internal profiles in the form of an Archimedean spiral, and intended to be assembled by instantaneous jamming, the pieces being shown in their unlocked position;

Fig. 3 is a section along 3—3 of Fig. 2;

Figs. 4 and 5 are views corresponding to Figs. 2 and 3, showing the two pieces in their tight-locked or jammed position; and Figs. 6, 7 and 8 are fragmentary longitudinal sectional views showing various shapes that can be given to the surfaces $a^1$, $b^1$ of parts $a$ and $b$ which are to jam together, the pieces in these views being shown in locked or tight-jammed relation.

As is apparent, the outline of the circumferential grooves in the pieces may be either triangular, triangular with rounded-off points (Fig. 6), of sinuous form (for example, by semi-circles juxtaposed and interlinked as in Fig. 7), or trapezoidal with rounded-off tops (Fig. 8), or have any other shape. In other words, instead of taking as a generatrix of the cylinders $a$ $b$ a straight line, there is taken one which is a zig-zag or broken line, or a sinuous line, etc., as shown in Figs. 2, 6, 7 and 8, located in a plane passing through the axis of the cylinder. These generatrices may, during the generation of the surface, either have no displacing movement in a direction parallel to the axis so that the grooves will be closed upon themselves, or, during the engendering these generatrices may be animated, at the same time as the rotating movement, with a travelling movement in a direction parallel with the axis, which movement is proportional to the continuous rotation, the directrix being animated with the same travelling movement, so that turns of the grooves formed in the spiral surfaces will be a continuation of each other, as in the case of a screw with one or several threads.

The coactive surfaces of the male and female parts having been formed as pointed out above, upon the male piece being introduced endwise into the female piece (which may be readily done due to the slight clearance left between the tops of the ribs of the two grooved pieces when their spiral profiles are in register as shown at $j$ in Fig. 3, which clearance may be of the magnitude of $\frac{1}{10}$ of one millimeter) until the grooves of one piece are opposite the ribs of the other, the male piece $a$ may be turned in the direction of arrow $f$, Figs. 3 and 5, while keeping the female piece $b$ stationary, whereupon grooves $a^1$ of the male piece are entered by the ribs lying between grooves $b^1$ of the female piece $b$, and the ribs of piece $a$ enter the grooves of piece $b$. The jamming once being produced, the effort required to displace one piece with respect to the other in the axial direction becomes equal to that necessary to cause the ribs formed by grooving of the pieces to give way. The outline of these grooves and ribs may be selected in such manner as to ensure that, as shown in Figs. 6 and 8, it will be only the sides $m\ n$ of the ribs that come in contact, thus securing, besides the advantage of a greater stability of the binding of the two pieces with respect to axial stresses, the following advantages:

1. A more powerful jamming for a given effort for the turning of the male piece in the female piece in locking direction;

2. The possibility of securing the jamming with the largest spiral pitches and, in consequence, the possibility of employing deeper grooves; and 3. Greater frictional resistance to turning in unlocking direction.

The depth of the grooves should be selected in such manner that, in order to obtain contact of the pieces and the jamming, one will not have to turn the pieces relatively to each other through an angle of more than 90° to effect locking and unlocking. For instance, if the ribs come in contact by their tops with the bottoms of the grooves, in case of pieces the directing spiral of which has a maximum radius-vector at the top of the ribs of 10 mm. and the pitch of which is 3 mm., the radial clearance to permit endwise introduction of the male piece into the female piece being 0.1 mm., it will be necessary to turn the male piece through an angle $\gamma$ such that $$\frac{\gamma}{360} = \frac{0.1}{3} \text{ or } \gamma = \frac{36}{3} = 12°$$

for the tops of the ribs to coincide when projected axially of the pieces, and if the depth of the grooves is 0.5 mm. it will be necessary to turn by $$\frac{S}{360} = \frac{0.5}{3} \text{ or } S = \frac{180}{3} = 60°$$

for the tops of the ribs of one piece to come in contact with the bottoms of the grooves of the other piece, thereby bringing about the jamming, making, in the aggregate, a rotation of 72°. But if the contact is made through sides $m\ n$ of the ribs under an angle $\beta$, the condition for the taking place and the preservation of the jamming is $tg$ (tangent) $\alpha < \frac{f}{\sin \beta}$ instead of $tg\ \alpha < f$. This shows that it is possible to increase considerably $\alpha$ and therefore the pitch of the spirals and consequently the depth of the grooves. In the foregoing case one may, by imparting to the grooves an equilateral triangular profile ($\beta = 30°$), employ spirals of a pitch of 6 mm. and groove depths of approximately 1 mm., without diminishing the value of the jamming.

Figs. 2, 3, 4 and 5 show grooved pieces, each groove being closed on itself. As pointed out above, there may be employed turns of grooves in helical paths following each other in the manner of the turns of a helix, but this arrangement, which is the one making possible a high-speed machining, is not always practicable. With this latter kind of grooves, as a matter of fact, the tightening of pieces $a\ b$ brings about a relative displacement of the pieces in the direction of their axes, a displacement which is at times neither possible nor desirable. Whatever the arrangement adopted for the grooves and whatever their outline, the said grooves may be formed in accordance with the process described in the prior French Patent No. 648,334 of June 15, 1927, both in the case where the pieces are cylindrical and in the case where they are helicoidal with a very elongated pitch, i. e. in the case where on the piece the locus of a certain definite point of the spirals (sections of pieces), for instance point $c$ Fig. 1, instead of being a straight line parallel to the axis, is a helix of very elongated pitch. It is conceivable that changes may be made in the device described above, without overstepping the scope of the invention.

What I claim is:

1. Separably connected members each provided with parallel annular ribs and grooves lying in planes perpendicular to its axial line, the bottoms of the grooves and crests of the ribs each extending around the axial line of the connected members in a path defined by substantially one turn of an Archimedean spiral line united by a shorter line, the groove profiles of each member registering axially of the member and the rib profiles of each member also registering axially of the member, the ribs of each member being wedged in the grooves of the other member with their crests out of contact with the bottoms of the grooves at the limit of relative rotative adjustment therebetween in member-connecting direction, and the ribs of one member being movable transversely past the ribs of the other member to axially connect and disconnect the members when the members are relatively rotatively adjusted in the opposite direction to cause the short profile lines of the rib crests of one member to closely approach the corresponding profile lines of the rib crests of the other member.

2. A joint of the kind comprising two members held separably coupled by endwisely telescoped male and female portions thereof that are relatively rotatively adjusted into peripherally wedged engagement and have, respectively, an external and an internal profile in right section each consisting of an Archimedean spiral line and a second line connecting the ends of said spiral line, wherein the male and female portions are, respectively, externally and internally grooved to provide on each a series of parallel annular ribs, all the ribs on both portions being wider at the base than at the crest and normally being of identical size and profile with less space between the ribs of each series than is required for full mating of the two series of ribs, the said portions being telescopically and rotatively interfitted with the ribs of each portion wedged between the ribs of the other portion.

In testimony whereof I hereunto affix my signature.

HUGUES LOUIS DARDELET.